United States Patent [19]
McGinley

[11] 4,311,717
[45] Jan. 19, 1982

[54] STABILIZING AGENT FOR DRY MIX FOOD PRODUCTS

[75] Inventor: Emanuel J. McGinley, Morrisville, Pa.

[73] Assignee: FMC Corporation, Philadelphia, Pa.

[21] Appl. No.: 150,821

[22] Filed: May 19, 1980

[51] Int. Cl.³ .............................. A23C 3/08; A23L 2/00
[52] U.S. Cl. ................... 426/330.2; 252/356; 426/330.3; 426/580; 426/583; 426/590; 426/654
[58] Field of Search ............... 426/330.2, 330.3, 580, 426/583, 584, 588, 590, 593, 654, 657, 456, 471, 519, 573; 106/163 R, 168, 197 C; 536/63; 252/316, 351, 356

[56] References Cited
U.S. PATENT DOCUMENTS 3,013,881 12/1961 Carlson et al. ............... 426/584 X
3,027,257 3/1962 Shenkenberg ................ 426/584 X
3,539,365 11/1970 Durand et al. ................ 106/197 C
3,684,523 8/1972 McGinley et al. ............. 426/584 X
3,943,264 3/1976 Davis ........................... 426/654 X
3,993,793 11/1976 Finney ......................... 426/654 X
4,183,970 1/1980 May et al. .................... 426/583
4,216,242 8/1980 Braverman ................... 426/654 X
4,263,334 4/1981 McGinley ..................... 426/573

Primary Examiner—Arthur L. Corbin
Attorney, Agent, or Firm—Charles H. Johnson; Eugene G. Horsky

[57] ABSTRACT

A stabilizing agent for dry mix food products is a powder the individual particles of which consist of beta-1, 4 glucan, sodium carboxymethyl cellulose and either whey or milk solids. The composition of the stabilizing agent and the method of making and using the same are disclosed.

3 Claims, No Drawings

STABILIZING AGENT FOR DRY MIX FOOD PRODUCTS

This invention relates to the preparation and composition of a powder capable of functioning as a stabilizing agent for dry mix food products and particularly to a stabilizing agent for so-called instant mixes for foods such as chocolate drinks, ice cream mix, toppings, puddings, etc.

U.S. Pat. No. 3,539,365 to Durand et al. describes a stabilizing agent consisting primarily of beta-1,4 glucan but having intimately associated therewith a relatively small amount, from about 5% to about 15% based upon combined weight, of a specific sodium carboxymethyl cellulose. The product of this Durand et al. patent has been successfully used for a number of years as a stabilizing agent in a variety of food products including a heat sterilized artificial dairy drink as described in U.S. Pat. No. 3,684,523 to McGinley et al. As described in said U.S. Pat. No. 3,539,365, the beta-1,4 glucan is in the form of colloidal size microcrystals derived from a suitable cellulose source such as wood pulp by chemical degradation and mechanical disintegration in the presence of water. This beta-1,4 glucan is commonly referred to as microcrystalline cellulose. According to U.S. Pat. No. 3,539,365, a relatively small amount of water-soluble sodium carboxymethyl cellulose (CMC) is introduced in dry powder form during the mechanical disintegration, and as disintegration proceeds, the dissolved CMC at least partially coats the beta-1,4 glucan microcrystals and prevents the microcrystals from rebonding to one another upon subsequent drying. By reason of the coating of CMC, the dried beta-1,4 glucan microcrystals are readily redispersed in an aqueous medium with only mild agitation. The product of U.S. Pat. No. 3,539,365 is one component of the powder form stabilizing agent of the present invention.

While various functional properties of dispersed colloidal beta-1,4 glucan have proven beneficial in a number of wet processed systems for pre-prepared food products, the dried beta-1,4 glucan powder has not proven useful in a large food product category known as dry mix preparations, being particularly ineffective in dairy-related dry mix food products such as so-called instant chocolate drinks. It is believed that the protein and calcium salts contained in dry mix food preparations inhibit peptization of the colloidal size beta-1,4 glucan microcrystals. In certain instances extreme levels of shear which would be available in a commercial food plant can be utilized to peptize the powder particles of U.S. Pat. No. 3,539,365 in the presence of milk products; however, consumer reconstitution of dry mix food products dictates the activation or peptization of stabilizer components with simple mixing such as spoon stirring.

Commercially made, ready for consumption, chocolate milk drinks employ various stabilizers including the product of U.S. Pat. No. 3,539,365 to hold the cocoa in suspension. There are available for home use dry cocoa, powders and instant mixes which can be added to water or milk to form a chocolate flavored milk or milk-like drink. A major disadvantage of homemade chocolate milk drinks is that the cocoa particles settle very rapidly and if the drink is not consumed very quickly after being prepared or is not stirred continuously the cocoa particles form a heavy sludge in the bottom of the glass or other container, leaving the milk practically devoid of cocoa.

The invention of this application provides a dry powder stabilizing agent for dairy related and other dry mix food products which can be effectively dry blended. Prior to the present invention, the functionability of the product of the Durand et al. U.S. Pat. No. 3,539,365 as a food stabilizing agent was obtainable only by a two-step process wherein the stabilizing agent was first dispersed in water, after which the other dry ingredients were added to the dispersion. Food products in connection with which the invention is useful include pie fillings, bake goods such as cake, pancake and waffle mixes, batters and breadings, frozen dairy type desserts, etc. As will presently become apparent, the invention is not particularly suitable for stabilizing acidic foods.

It has been found that the product of U.S. Pat. No. 3,539,365; namely, beta-1,4 glucan having a small amount of a particular sodium carboxymethyl cellulose intimately associated therewith, can be dry blended with dairy related and certain other dry mix food products to serve as an effective stabilizing agent if the beta-1,4 glucan and CMC has a dairy product such as whey, milk or cream intimately associated therewith as a third component. While skim milk, whole milk or cream or the solids thereof can be used, the preferred material is whey, particularly sweet dairy whey which is derived from Swiss or mozzarella cheese. Sweet dairy whey has the advantage of being light in color and having a relatively bland taste that does not substantially affect the taste of the final product. A further practical advantage of whey over milk or cream is the relatively low cost. It is this use of whey or milk that causes the product to be impractical for use in strong acidic environments.

In making the stabilizing agent of this invention it is important that the sodium carboxymethyl cellulose be properly associated with the beta-1,4 glucan before the whey or milk is introduced. In general, this proper association is obtained by forming an intimate mixture of water, disintegrated beta-1,4 glucan at least 1% by weight having a particle size not exceeding about 1 μm, and sodium carboxymethyl cellulose having a degree of substitution of 0.75±0.15, the amount of sodium carboxymethyl cellulose being from about 5% to about 15% based on the combined weight of beta-1,4 glucan and sodium carboxymethyl cellulose, drying the mixture and recovering a powder consisting of water-insoluble, water-dispersible particles capable of forming an aqueous gel wherein at least 1%, by weight, of dispersed particles have a particle size not exceeding about 1 μm. For further details as to the method of forming the water-insoluble, water-dispersible particles reference may be made to the aforementioned U.S. Pat. No. 3,539,365.

The whey or milk solids can be added to an aqueous dispersion of the product of the U.S. Pat. No. 3,539,365, namely the intimately associated beta-1,4 glucan and sodium carboxymethyl cellulose, prior to the drying and recovery steps or the dried beta-1,4 glucan/CMC powder may be redispersed in water and the whey or milk solids then added to the dispersion. The whey or milk solids may be added in dry powder form or as reconstituted in water or in a raw liquid state. After the addition of the whey or milk solids the entire dispersion is thoroughly mixed until a homogeneous slurry of the three components is obtained. The whey or milk solids is added in an amount such that the solids content of the slurry has a ratio of whey or milk solids to the beta-1,4 glucan/CMC powder of between 1:1 and 9:1, preferably about 3:1. A ratio of 1:1 is the minimum level of whey necessary to obtain the functionality of the beta-1,4 glucan/CMC powder. A ratio of more than 9:1 produces a product wherein the particles are so predominately whey or milk that the dispersion of beta-1,4 glucan/CMC particles is inhibited until the whey or milk solids dissolve, thus prohibiting the desired instant dispersion of the microcrystalline cellulose. After obtaining homogeneity, the slurry is mechanically milled.

The three intimately associated components, the beta-1,4 glucan, the sodium carboxymethyl cellulose and the whey or milk solids are dried and recovered as a powder having a moisture content of approximately 0.5% to 4%. Various methods of drying and recovering the powder may be employed. For example, the slurry may be put through a spray dryer to produce a fine average particle size having the desired moisture content at the time of leaving the dryer. An aggregated, free flowing material of larger particle size may be obtained by recirculating the finest fraction of the dried product through the spray dryer. Another method of recovering free flowing material is post-crystallization wherein the material is discharged from the spray dryer at a moisture content of approximately 12% to 18% onto a belt to allow time for sugars to crystallize, then drying with hot air to the desired moisture content.

The stabilizer powder particles prepared as above described when blended into dry food mixes and reconstituted in water instantly hydrate and disintegrate into individual microcrystals with simple mild agitation. In addition, when utilized at proper concentrations, dispersed microcrystals quickly link into a weak gel network and provide immediate functionality in the form of emulsion stability and foam stability. The microcrystals also serve as a suspending agent and an aqueous thickener.

Following are some examples of the use of the powdered stabilizing agent of the invention.

EXAMPLE I

Whipped Topping Mix

A spray dried composition having the following ingredients was prepared:

| Ingredients | Percent by Weight |
|---|---|
| Corn syrup solids | 12.55 |
| Sugar | 11.11 |
| Sodium Caseinate | 10.04 |
| Vegetable fat | 55.24 |
| Emulsifier | 11.06 |

The foregoing composition was dry blended with sugar and the stabilizer powder of this invention consisting of three parts whey and one part of the combined beta-1,4 glucan and CMC in the following amounts:

| Composition above | 71.35% |
|---|---|
| Sugar | 24.30% |
| Stabilizer powder | 4.35% |

A whipped topping having body and texture and taste similar to whipped cream was produced by whipping 131 grams of the dry mix with 250 grams of whole milk. The whipped topping retained its foam structure for four to six hours at refrigerated temperatures.

EXAMPLE II

Chocolate Drink

A powdered chocolate drink mix was prepared by blending the following ingredients for thirty minutes in a Patterson-Kelly twin shell blender:

| Ingredients | Grams |
|---|---|
| Cocoa | 5.0 |
| Sugar | 75.0 |
| Non-fat Dry Milk | 28.0 |
| Stabilizer Powder | 40.0 |
| | 148.0 |

The stabilizer powder was the same composition as used in Example I. The dry mix was gradually added to 852 grams of hot water and stirred vigorously for 15-30 seconds to produce a chocolate drink which was stable with no visible evidence of cocoa particles settling after standing for 24 hours.

EXAMPLE III

Dry Ice Milk Mix

A mix having the following formula was prepared as explained below:

| Ingredients | Grams |
|---|---|
| Fat (butter) | 125.00 |
| Sugar | 425.00 |
| Non-fat dry milk | 225.00 |
| CMC | 2.50 |
| Emulsifier | 3.75 |
| Stabilizer powder | 100.00 |
| | 881.25 |

The CMC was a high viscosity food grade and the emulsifier was a blend of mono and diglycerides from the glycerolysis of edible fats and polysorbate sold by ICI, Inc. under the trademark Tween Moss 100K. The stabilizer powder was the powder of this invention consisting of three parts non-fat milk solids and one part of the combined beta-1,4 glucan and CMC. The formula was prepared by mixing melted butter with the emulsifier to form a liquid phase which was added slowly to the other ingredients which were being dry blended in a Hobart mixer. Mixing was continued until the melted butter has solidified and the dry mix was reconstituted with tap water sufficient to provide a 2500 gram mix. The reconstituted mix was stirred for 30 minutes with a Lightenin' mixer and then frozen at 21° F. After standing for 24 hours, the hardened product was stable and when taste tested had a good body and smooth texture.

Having thus described the invention, what is claimed is:

1. A powder stabilizing agent for dry mix food products, the individual particles of said powder consisting of an intimate admixture of beta-1,4 glucan, sodium carboxymethyl cellulose and either whey or milk solids, the ratio by weight between the whey or milk solids and the beta-1,4 glucan combined with the sodium carboxymethyl cellulose being between 1:1 and 9:1.

2. The powder of claim 1 wherein said ratio is about 3:1.

3. The powder of claim 1 wherein the whey or milk solids is sweet dairy whey.

* * * * *